United States Patent
Körber

[11] Patent Number: 5,870,151
[45] Date of Patent: Feb. 9, 1999

[54] METHOD AND EQUIPMENT FOR THE DETECTION OF UNDESIRED VIDEO SCENES

[76] Inventor: Matthias Körber, Mecklenburger Strasse 5, D-90579 Langenzenn, Germany

[21] Appl. No.: 605,116

[22] PCT Filed: Aug. 27, 1994

[86] PCT No.: PCT/EP94/02843

§ 371 Date: May 1, 1996

§ 102(e) Date: May 1, 1996

[87] PCT Pub. No.: WO95/06985

PCT Pub. Date: Mar. 9, 1995

[30] Foreign Application Priority Data

Aug. 31, 1993 [DE] Germany .......................... 43 29 274.7

[51] Int. Cl.[6] .................. H04N 5/44; H04N 5/46
[52] U.S. Cl. .......................... 348/553; 348/558; 348/559
[58] Field of Search .......................... 358/908; 348/907, 348/700, 701, 634, 635, 553, 558, 559; 386/1, 46, 45, 125, 126; 360/69; H04N 5/44, 5/46

[56] References Cited

U.S. PATENT DOCUMENTS

| | | | |
|---|---|---|---|
| 4,319,286 | 3/1982 | Hanpachern | 358/908 |
| 4,390,904 | 6/1983 | Johnston et al. | 358/908 |
| 4,750,052 | 6/1988 | Poppy et al. | 358/335 |
| 4,918,531 | 4/1990 | Johnson | 358/183 |
| 5,343,251 | 8/1994 | Nafeh | 348/571 |
| 5,355,161 | 10/1994 | Bird et al. | 348/907 |
| 5,436,653 | 7/1995 | Ellis et al. | 348/907 |
| 5,668,917 | 9/1997 | Lewine | 358/908 |

FOREIGN PATENT DOCUMENTS

| | | |
|---|---|---|
| 0 210 609 | 2/1987 | European Pat. Off. . |
| 0 248 533 | 12/1987 | European Pat. Off. . |
| 41 06 246 | 3/1992 | Germany . |
| WO 93/22875 | 11/1993 | WIPO . |

*Primary Examiner*—Tommy P. Chin
*Assistant Examiner*—Nhon T Diep
*Attorney, Agent, or Firm*—Pillsbury Madison & Sutro

[57] ABSTRACT

In order to suppress undesirable video scenes, such as advertisements during a television program, it is known to suppress the undesirable video scenes by image processing when characteristic images for the beginning and end of the undesirable video scenes are known. Since many broadcasting stations have started to characterize only the beginning of the advertisements, however, the known process does not ensure the return to the television program at the end of the advertisements. The method allows undesirable video scenes to be reliably detected for recording the same or for reliably returning to the television program when the undesirable scenes are suppressed. For that purpose, when the beginning of an advertisement is recognized, an image that precedes in time the beginning of the advertisement is recorded. When advertisements are finished, broadcasting stations usually repeat a small part of the television program, so that the end of the advertisements may be detected by correlating to the previously recorded image.

41 Claims, 1 Drawing Sheet

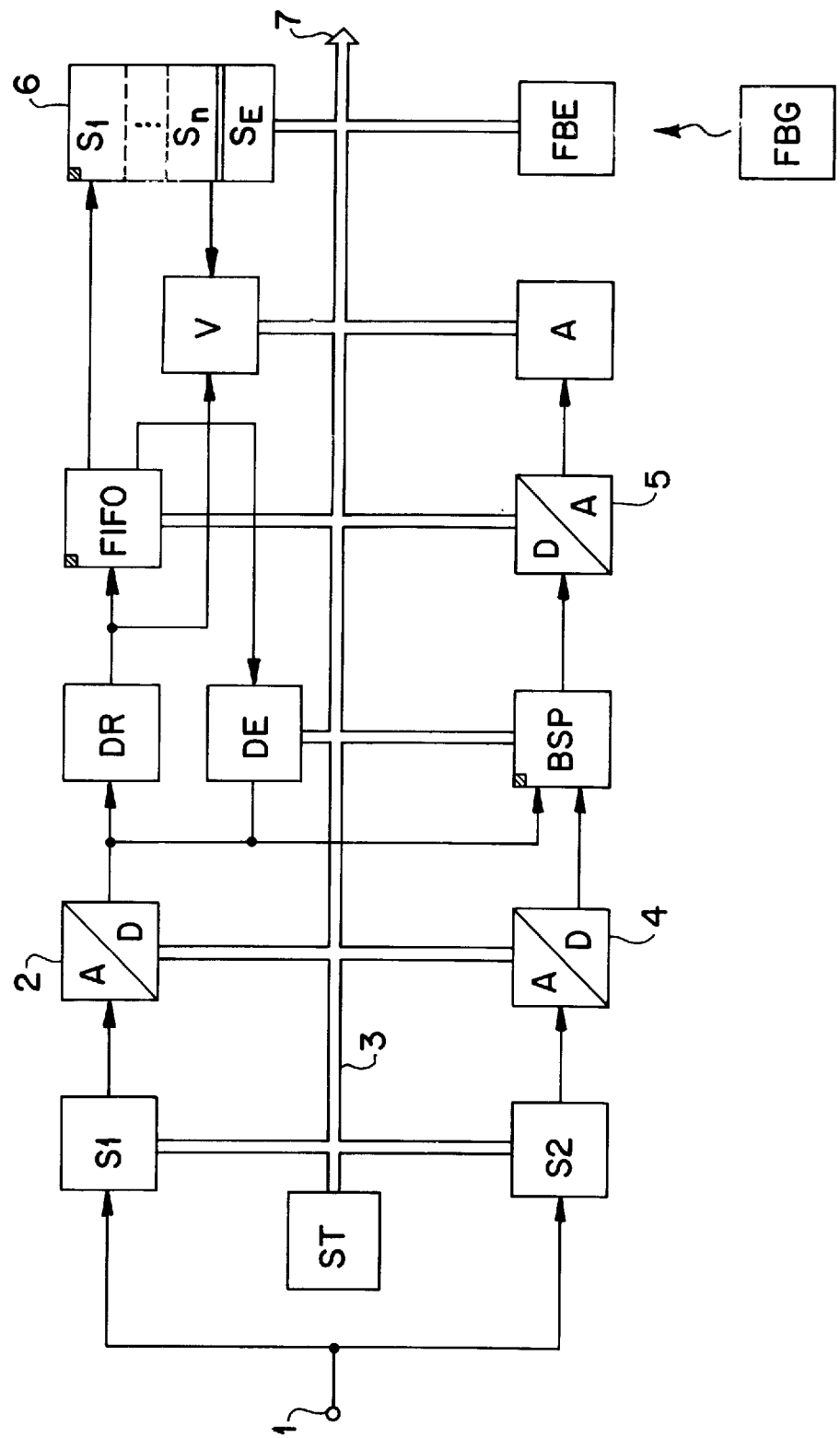

METHOD AND EQUIPMENT FOR THE DETECTION OF UNDESIRED VIDEO SCENES

BACKGROUND OF THE INVENTION

The invention concerns a method and an equipment for the automatic detection of undesired video scenes from a current television transmission, which is achieved by the evaluation of frames, in particular initial frames, of the undesired video scenes.

By many transmitting stations, the current transmissions are interrupted and promotional contributions are faded in. These promotional contributions represent a disturbing interruption for most of the viewers. Proposals are already known in order to suppress the disturbing promotional contributions. One of these proposals is to switch the sound off during the promotional contribution. The patent specification U.S. Pat. No. 3,870,956 shows a circuit which suppresses the sound of the promotional contribution for a predetermined time. For this purpose, an operating person (the viewer) must actuate the corresponding key of a remote control transmitter at the beginning of the promotion. When however only the sound is interrupted, the viewer has still to observe the promotional contributions.

An equipment with a mode which permits the observation of the promotional contribution to be circumvented by the actuation of the transmitting station selecting keys or of the pause key is known from the document EP 0 384 388 A1. Whilst the program of another transmitting station can be viewed, an information that a preset time span has run down is faded in on the picture screen of the television receiver so that the viewer can return to the original transmitting station.

It is a disadvantage of the aforementioned proposals that the viewer must always press a key at the beginning of the promotion in order to suppress the promotional contribution. It is furthermore disadvantageous that, due to the run-down of a fixedly preset time, the end of the respective promotional contribution can not be determined exactly.

These disadvantages are avoided in the description, which is described in the German Patent Specification DE 41 06 246 C1, by the beginning and end of a promotional contribution, after a single identification and storage of the frames characterising the beginning and the end of promotional blocks by an operating person, being recognised automatically by the equipment. Thus, the automatic suppression of promotional contributions is possible without losing desired program information.

After the transmitting institutions have often gone over to characterising only still the beginning of a promotional block by a special image, it is no longer possible by means of the known equipment to recognise the renewed beginning of the transmission interrupted by the promotional block. For that reason, the uninterrupted transmission is not automatically displayed again after termination of the promotional block.

It is evident from the preceding explanations that it is imperative for the fading-out, for example of a promotional transmission received as undesired transmission contribution, to be able to perform an unobjectionable identification of such a transmission contribution also when this is not marked by identification signals at the transmitter end.

The unobjectionable identification and its timely detection of so-called undesired video scenes is however necessary also for statistical investigation and for commercial reasons. When a promotional transmission order is given, it can be proved at a receiving location, for example by identification, that this promotional contribution is also radiated in its full length. For the detection of such picture signals, a method for the re-recognition of unique image signals, in particular of unique image sequences, is known from the DE 43 09 957 C1, according to which method luminance values of predetermined pixels and preferably predetermined groups of pixels (clusters) are scanned. In a further method step, a different signal between the luminance values of the predetermined clusters is formed and a mark function is derived from this. For each complete frame, a binary feature vector thus arises, the length of which corresponds with the number of the clusters scanned for each full frame. For a predetermined number of successive full frames (for example 51), a frame sequence feature vector is then formed, which is brought up to date after each full frame. After each full frame, the up-dated feature vector is correlated with a plurality of feature vectors, which are determined in the same manner, and identify the stored frame sequences to be recognised again. For a predetermined correlation value, a signal "frame sequence recognised again" is produced. It is possible in this manner to detect a promotional transmission which is regarded as an undesired video scene in the sense of the present application, but can however also count as a desired one. With appropriate selection of the clusters and time determination during the reception of a video scene at the beginning and at the end, the signals in that case give an exact information about the length of the scene which has been received so that an image scene association (individual promotional spot) as well as also a detection of the transmission, which has taken place altogether, of the undesired video scene is possible. These known methods are however not designed for also being able to evaluate images in front of the undesired scene and after the undesired scene in order for example to be able to detect into which scene portion of a current television transmission, for example of a film, these video scenes have been introduced or even to be able to be utilised for fading out the undesired image scene.

BRIEF SUMMARY OF THE INVENTION

It is therefore the object of the invention to improve a method and an equipment of the initially described kind towards a reliable finding of the beginning and the end of an undesired transmission contribution, for example of a promotional contribution, being possible without the respective cooperation of an operating person.

This problem is solved according to the invention by features to be described below.

The advantage of the invention lies in that only the beginning or the image scenes, which are to be included in the evaluation, have to be marked once each time on the observation of an undesired video scene, whilst in the case of repetition of the fading-in of such undesired image scenes, for example in the evening programme of a transmitter, these require no repeated input, since the system automatically recognises these undesired video scenes with the aid of the initial presettings and their evaluation. The method is beyond that also usable when the undesired image scenes of a video scene in the subsequent transmissions of an evening programme do not repeat in the same sequence or in another image scene composition, for example other promotional contributions. For this case, it is provided that the scene contributions of several undesired video scenes are stored and evaluated, in which case it is to be presupposed that, for example within a promotional transmission from one and the same transmitter, the promotional spots are transmitted repeatedly at least within one daily transmission or one weekly transmission. By the comparison check with stored possible scene frames or clusters of such images, different sequences of the scenes are also taken into consideration. Thus, it is possible in every case according to the invention to be able to ascertain the beginning and the end of an undesired scene unobjectionably even when the final scene (last promotional spot) of an undesired video scene is not known. A further advantage also lies in that only one frame characterising the beginning of promotional contributions need be stored each time by the user, wherein the frame characterising the end of promotional contributions is obtained automatically from the current transmission contribution. Thus, the reliable recognition of the end of a promotional contribution is assured.

A method according to the invention displays the advantage in that the finding of the beginning and end of undesired video scenes is improved by the additional check, for example for the presence or absence of a transmitter identification.

The embodiment of the equipment according to the invention displays the advantage that the storage requirement of the storage device, which records the initial frame and the respective final frame of the undesired video scenes, is reduced by the data reduction.

The use of the storage device according to the invention enables the reaction times of the user or of the control equipment for the selection of the initial frames and the final frames of the undesired video scenes to be compensated for.

According to another embodiment of the invention, a second signal processing equipment and, in case of need, a second analog-to-digital converter is provided. Thereby, it is made possible for viewers to view program contributions of other transmitting stations during the transmission, for example, of a promotional contribution (by the transmitting station selected by him at the first signal processing equipment). Furthermore, the continuation of the program contribution of the originally set transmitting station is possible at the end of the promotional contribution without time overlap.

The additional key of the remote control transmitter have the advantage that they make a simple operation possible for the user of the equipment.

In an embodiment according to the invention, by the presentation of a pause switching pulse for a possibly connected video recording device on the recognised beginning of an undesired video scene, for example at the beginning of the promotion, the video recording is interrupted and only continued again when the promotional contribution is terminated. Thereby, the video recording of promotion is avoidable and the recorded program contribution can be reproduced without disturbing interruptions and repetitions.

Further equipments for the performance of the method are indicated in detail below.

In the case of the use of a method and an equipment for the performance of the method, in which the mean values of the luminance signal of a cluster are used, an evaluation can take place in the mode and manner described in the DE 43 09 957 C1 and namely not only for the frame scenes of the undesired scenes, but also for the frames Tying in front of the undesired scenes and for the frames lying behind the undesired scene.

BRIEF DESCRIPTION OF THE SEVERAL VIEWS OF THE DRAWING

The invention is described and explained in the following by reference to one figure in augmentation by the example of the evaluation for the fading-out of an undesired video scene.

DETAILED DESCRIPTION OF THE INVENTION

The figure shows the block schematic diagram of an embodiment of the equipment according to the invention as component of a television receiver.

The television signals, which are for example received by way of an aerial and are to be processed, are fed into 1 and the decoded colour television signal of the transmitting station selected by way of the remote control transmitter FBG is present at the output of the signal processing equipment S1 for further processing. When a transmitting station is selected by way of the remote control transmitter FBG, the remote control transmitter FBG sends the necessary information data to the remote control receiver FBE, which is connected by way of the data bus 3 (for example $I^2C$ bus for the control of the components of the entire equipment) with the control equipment ST, which consists substantially of a microprocessor and a storage device containing the control program. The control equipment ST then initiates the necessary tuning operation of the tuner, which is contained in the signal processing equipment S1, to the frequency of the selected transmitting station. The analog colour television signal is converted by the analog-to-digital converter 2 into a digital signal, written into the frame storage device BSP, read out from there, converted back by way of a digital-to-analog converter 5 and displayed by means of the display equipment A.

Advantageous refinements of the method according to the invention assure an additional reliability in the evaluation in order to avoid erroneous decisions during the automatic checking as far as possible so that also in the case of absence, for example on reception of a transmitted transmission, this can be recorded by a video recorder without intermediate recording of undesired video scenes, for which the recognition signals are drawn on for the control of the video recorder so that the recording is interrupted during the time of the fading-out of the undesired scene and continued immediately again when it is known that a continuing transmission to be recorded is concerned, for example the continuation of the video scenes of a feature film.

The method according to the invention is however usable not only for the fading-out or interruption and continuation of recordings of continuing transmissions with the exclusion of the undesired scenes, but in particular also for the exact detection of such undesired scenes, as needs to be carried out for statistical purposes, as already mentioned at the beginning.

The equipments, which are provided for the performance of the method, are described herein.

In order to avoid the display of promotion, a mode of operation, for which the promotional contributions are not made visible by the display equipment A, can be activated by way of the remote control transmitter FBG. In place of the promotional contribution of the selector transmitting station, the television signal of another preselected transmitting station, which signal is present by way of a second signal processing equipment S2 and a second analog-to-digital converter 4 at the second input of the frame storage device BSP, can be written into this and be displayed by way of the digital-to-analog converter 5 and the display equipment A for the duration of the promotional contribution.

During the display of the television signal of the second signal processing equipment S2, the free selection of desired transmitting stations, which are tuned by the control equipment ST in the tuner of the signal processing equipment S2, is possible by way of the remote control transmitter FBG. With the use of the frame storage device BSP, it is also possible to view several programs at the same time, which are shown as partial images on the picture screen of the display equipment A in order to obtain an overview of the actual programme offer.

After termination of the promotional contribution of the originally selected transmitting station, the programme contribution of this transmitting station coming from the analog-to-digital converter 2 is again written into the frame storage device BSP and displayed on the display equipment A. The switching-over of both the digital television signals present at the frame storage device BSP takes place through the control equipment ST as soon as the beginning or the end of a promotional contribution has been recognised. Beyond that, the control equipment ST generates a pause switching pulse which is made available to the connection terminal 7 by way of the data bus 3 in order to be able to interrupt the recording of a programme contribution by means of a video recorder for the duration of a faded-in promotional contribution.

The recognition of the beginning or the end of a promotional contribution is possible, since many transmission institutions identify the beginning of promotional contributions by special images and sound sequences. These characteristic images are marked by the viewer and filed in the storage device 6. In order to limit the size of the storage device 6, the image data are subjected to known two-dimensional data reduction processes in the data reduction equipment DR and only the luminance information of the first half frame is evaluated each time. The storage device 6 is so built up that it can record the respective initial image of different promotional contributions for a transmitting station.

The identification of the initial image for a selected transmitting station takes place through an operating person in that the viewer at the beginning of the promotion actuates the key "beginning of promotion" of the remote control transmitter FBG. Since the actuation of the key always takes place only after a certain reaction time, a storage device FIFO is provided, which stores the frames for example of one second and can be realised as FIFO storage device. The data-reduced frames stored there are reconverted in the expansion equipment DE and displayed by way of the frame storage device BSP and the digital-to-analog converter 5 on the display equipment A. The images are displayed at an adequate time spacing (about 1 second) on the display equipment A so that the operating person can react and select the most suitable initial image. On repeated actuation of the key "beginning of promotion", the reduced data of the selected initial image are stored in the respective storage place $S_1$ to $S_n$ for the selected transmitting station in the storage device 6.

For the case that the mode of operation, which prevents the display of promotional contributions, is set by way of the remote control transmitter FBG, the characteristic initial frame or frames of the promotional contribution of the selected transmitting station set in the signal processing equipment S1 is given out of the storage device 6 to comparator V, which compares it with the current images of this transmitting station. On agreement with an initial image, the beginning promotional contribution is suppressed and the transmitting station received by means of signal processing equipment S2 is displayed, as described above. At the same time, under the control of the unit ST, a frame, which is intermediately stored in the storage device FIFO and was radiated by the transmitting station in time before the frame characterising the beginning of the promotional contribution, is written into the storage place $S_E$. For this purpose, the storage device FIFO must be at least so great that the frames, which are transmitted by the transmitting station during the time span needed for the checking of a frame by the equipment, can be stored. Thereby, it is assured that a frame, which is a component of the program contribution, is written into the storage spage $S_E$. Since a certain time span of the previously transmitted program contribution is usually repeated after promotional contributions, the end of the promotional contribution is to be recognised reliably on the renewed occurrence of the frame stored in the storage space $S_E$ and the return to the original, now promotion-free transmitting institution can take place. Subsequently, the comparison process is repeated beginning with the initial frame and subsequent ascertaining of the final frame for the respectively ascertained promotional contribution.

The avoidance of the display of the certain time span, which is repeated by the transmitting institution, of the program contribution is particularly advantageous for the drive control of a video recorder by way of the connecting terminal 7.

The operation of the equipment is possible also without the frame storage device BSP when, instead thereof, a change-over switch is used, which is actuated by the control equipment ST and which switches over the digital television signals on the occurrence of promotion. The simultaneous display of the television images of several transmitting stations by the display equipment A is then however no longer possible.

To improve the manner of function of the afore-described equipment, it can be provided moreover to evaluate the presence or absence of transmitter identifications. The transmitter identifications or transmitter logos are faded by the transmitting institutions into the current programme contributions, for example into the upper left-hand corner of the image. Thereagainst, promotional contributions usually contain no transmitter identifications of that kind.

The presence of a transmitter identification can be ascertained, for example, in that the changes of the image content of the current images are checked. If it shows itself in that case that no changes over a longer time span within a certain image region, it is highly probable that a transmitter identification faded in at this place is concerned.

Another possibility is that the user, for example by means of a cursor control, identifies the image region, in which the transmitter identification is situated. The thus fixed transmitter identification can be filed together with the initial frames in the respective storage places $S_1$ to $S_n$ in the storage device 6, whereby it is at disposal for later checks.

The almost fault-free functioning of the fading-out of promotional contributions can be achieved by the combination of the monitoring of the current transmissions in respect of initial and final image as well as also in respect of the presence or absence of the transmitter identifications.

A further possibility for the recognition of a promotional contribution is represented by the evaluation of the sound signal, as indicated above. The build-up of the equipment remains substantially the same as the aforedescribed, but processing equipments must be used, which are appropriate for the sound signal and are known in themselves.

I claim:

1. Method for the detection and suppression of undesired video scenes of a current television transmission comprising the following method setups:

a) storing at least one frame of an undesired video scene, which characterizes the beginning of the undesired video scene, b) continuously storing successive frames of the current television transmission, c) checking the frames of the current television transmission for agreement or correlation with the frame stored according to method step (a), d) generating a first recognition signal on ascertaining the agreement or correlation according to method step (c), e) storing a frame, which lies in time before the occurrence of the undesired video scene and has been stored according to method step (b), of the current television transmission, f) checking the frames of the undesired video scene and the scene following the undesired video scene for agreement or correlation with the frame stored according to method step (e), g) generating a second recognition signal on ascertaining the agreement or correlation according to method step (f), and h) suppressing display or recording of the undesired video scene in response to the first and second recognition signals.

2. Method according to claim 1 further comprising:
evaluating at least one of the first and second recognition signals for one of:
ascertaining the duration of an individual undesired video scene;
ascertaining the total length of video scenes transmitted during a certain transmission time period; and
checking the content of a video scene.

3. Method according to claim 1 wherein the first recognition signal is used for suppressing display or recording of the undesired video scene and the second recognition signal is used for resuming display or recording of the current television transmission.

4. Method according to claim 1 further comprising additionally checking for presence or absence of a transmitter identification for recognition of one of the beginning and end of the undesired video scene.

5. Method according to claim 1 further comprising automatically determining a frame to be stored in at least one of said storing steps, by evaluating identification signals in the current television transmission.

6. Method according to claim 1 further comprising determining a frame to be stored in at least one of said storing steps by visually observing a display of the current television transmission and inputting a storage command by a control device.

7. Method according to claim 1 wherein method step (f) comprises checking the undesired video scene and frames following the undesired video scene for components correlating with the frame stored in method step (e), and wherein the second recognition signal is generated on ascertaining of correlation.

8. Method according to claim 1 wherein the current television transmission contains a special channel identification transmitted in the frames of each undesired video scene, and said method further comprises additionally evaluating frames of the television transmission to determine the presence of an undesired video scene.

9. Method according to claim 8 wherein said step of additionally evaluating is performed by operation of a remote control transmitter by a viewer while viewing a display of the current television transmission.

10. Method according to claim 1 wherein method steps (c) and (f) comprise checking several frames or clusters of frames against stored ones for agreement, correlation, transmitter abbreviations, or transmitted pictograms.

11. Method according to claim 1 further comprising storing and checking sound associated with the stored frame or clusters of frames for phonetic characteristics and comparing these phonetic characteristics with phonetic characteristics of sound accompanying the current television transmission as additional comparison criteria, and wherein the second recognition signal is generated on agreement of the phonetic characteristics.

12. Method according to claim 1 further comprising additionally evaluating audio signals in the current television transmission in order to detect an audible sign accompanying an undesired video scene.

13. Method according to claim 1 further comprising:
storing data representing the duration of undesired video scenes,
setting a maximum duration of suppression of an undesired video scene,
comparing the duration represented by the stored data with the maximum duration, and
providing a further evaluation criterion for the presence or end of an undesired video scene when said comparing step indicates that the duration represented by the stored data exceeds the maximum duration.

14. Method according to claim 1 wherein said method is performed with respect to a limited number of selected transmission channels less than all available transmission channels.

15. Apparatus for performance of the method according to claim 1 comprising:
a first storage device for the storage of at least one frame of the undesired scene;
further storage devices for the constant intermediate storage of at least one frame of the current television transmission;
a third storage device for the storage of at least one frame preceding the undesired video scene;
a comparison circuit for the comparison of the frames and evaluation and/or ascertaining of correlated features;
a first circuit arrangement for the delivery of a recognition signal on agreement or correlation;
a further circuit arrangement for recording of the recognition signals; and
an evaluating circuit for evaluation of the recognition signals.

16. Apparatus according to claim 15 wherein the first recognition signal acts to initiate suppression of display or recording of the undesired video scene and the second recognition signal acts to initiate resumption of display or recording of the current television transmission.

17. Apparatus according to claim 15 wherein said comparison circuit compares frames of the undesired video scene with frames of the current television transmission and, upon ascertaining agreement of the compared frames, produces identification signals, and said apparatus further comprises a time measuring circuit for recording the identification signals as time measuring signals.

18. Method for the detection and suppression of undesired video scenes of a current television transmission comprising the following method steps:
a) storing a certain number of defined predetermined groups of pixels from a frame of at least one picture scene of an undesired video scene, which characterizes at least the beginning of the undesired video scene, b) continuously storing defined pictorially congruent groups of pixels of the frames of the current television transmission, c) checking the groups of pixels of the frames of the current television transmission for agreement or correlation with the groups of pixels stored according to method step (a), d) generating a first recognition signal on ascertaining the agreement or correlation of the groups of pixels according to method step (c), e) storing the groups of pixels, which have been stored according to method step (b), of a frame, which lies in time before the occurrence of the undesired video scene, of the current television transmission, f) checking the defined predetermined groups of pixels of the frame of at least one picture scene of the undesired video scene and the scene following the undesired video scene for agreement or correlation with the groups of pixels stored according to method step (e), g) generating a second recognition signal on ascertaining the agreement or correlation according to method step (f), and h) suppressing display or recording of the undesired video scene in response to the first and second recognition signals.

19. Method according to claim 18, wherein the groups of pixels of several selected frames of the undesired video scene are defined and stored and are compared with the groups of pixels, which are determined to agree in location, of the continuously intermediate stored frames of the current television transmission.

20. Method according to claim 18, wherein luminance values of the pixels of the predetermined groups of pixels are stored and compared one with the other to produce difference values and a mark function for the generation of the respective recognition signal is formed from the difference values.

21. Method according to claim 18 further comprising:
evaluating at least one of the first and second recognition signals for one of:
ascertaining the duration of an individual undesired video scene;
ascertaining the total length of video scenes transmitted during a certain transmission time period; and
checking the content of a video scene.

22. Method according to claim 18 wherein the first recognition signal is used for suppressing display or recording of the undesired video scene and the second recognition signal is used for resuming display or recording of the current television transmission.

23. Method according to claim 18 further comprising additionally checking for presence or absence of a transmitter identification for recognition of one of the beginning and end of the undesired video scene.

24. Method according to claim 18 further comprising automatically determining groups of pixels to be stored in at least one of said storing steps, by evaluating identification signals in the current television transmission.

25. Method according to claim 18 further comprising determining groups of pixels to be stored in at least one of said storing steps by visually observing a display of the current television transmission and inputting a storage command by a control device.

26. Method according to claim 18 wherein the current television transmission contains a special channel identification transmitted in the frames of each undesired video scene, and said method further comprises additionally evaluating frames of the television transmission to determine the presence of an undesired video scene.

27. Method according to claim 26 wherein said step of additionally evaluating is performed by operation of a remote control transmitter by a viewer while viewing a display of the current television transmission.

28. Method according to claim 18 wherein method steps (c) and (f) comprise checking groups of pixels of several frames or clusters of frames against stored ones for agreement, correlation, transmitter abbreviations, or transmitted pictograms.

29. Method according to claim 18 further comprising storing and checking sound associated with the stored for phonetic characteristics and comparing these phonetic characteristics with phonetic characteristics of sound accompanying the current television transmission as additional comparison criteria, and wherein the second recognition signal is generated on agreement of the phonetic characteristics.

30. Method according to claim 18 further comprising additionally evaluating audio signals in the current television transmission in order to detect an audible sign accompanying an undesired video scene.

31. Method according to claim 18 further comprising:
storing data representing the duration of undesired video scenes,
setting a maximum duration of suppression of an undesired video scene,
comparing the duration represented by the stored data with the maximum duration, and
providing a further evaluation criterion for the presence or end of an undesired video scene when said comparing step indicates that the duration represented by the stored data exceeds the maximum duration.

32. Method according to claim 18 wherein said method is performed with respect to a limited number of selected transmission channels less than all available transmission channels.

33. Apparatus for the performance of the method according to claim 18, comprising:
a first storage device for the storage of at least group of pixels of one frame of the undesired scene;
further storage devices for the constant intermediate storage of at least one group of pixels of at least one frame of the current television transmission;
a third storage device for the storage of at least one group of pixels of at least one frame preceding the undesired video scene;
a comparison circuit for the comparison of the groups of pixels and evaluation and/or ascertaining of correlated features;
a first circuit arrangement for the delivery of a recognition signal on agreement or correlation;
a further circuit arrangement for recording of the recognition signals;
an evaluating circuit for the evaluation of the recognition signals;
a selector circuit for the determination of the number and/or position of the groups of pixels; and
an intermediate storage device for reading out the groups of pixels of the frames of the undesired scene and reading those groups of pixels into the first storage device, wherein the comparison circuit performs the agreement and/or correlation between the groups of pixels and those defined groups of pixels of the frames which have constantly been stored intermediately in the further storage devices, and wherein the evaluating circuit delivers a recognition signal on agreement.

34. Apparatus according to claim 33 wherein the first recognition signal acts to initiate suppression of display or recording of the undesired video scene and the second recognition signal acts to initiate resumption of display or recording of the current television transmission.

35. Apparatus according to claim 33 wherein said comparison circuit compares groups of pixels of a frame of the undesired video scene with groups of pixels of frames of the current television transmission and, upon ascertaining agreement of the compared groups of pixels, produces identification signals, and said apparatus further comprises a time measuring circuit for recording the identification signals as time measuring signals.

36. Apparatus for suppressing undesired video scenes of a current television signal being received by one of a television receiver and a video recorder, said apparatus comprising:

first signal processing equipment tunable to a selected television channel for receiving and decoding an analog television signal being transmitted on the selected channel;

an analog-to-digital converter coupled to said first signal processing equipment for converting the received and decoded analog television signal into digital form;

a frame storage device coupled to said analog-to-digital converter for storing and reading out the television signal in digital form;

control equipment for controlling operation of said first signal processing equipment, said converter and said frame storage device;

a data bus coupling said control equipment to said first signal processing equipment, said converter and said frame storage device;

a second storage device having a plurality of first storage areas each for storing data representing at least a selected portion of an image which appears in a received television signal at the start of an undesired scene, each first storage area being associated with a respective television channel, said second storage device further having a second storage area;

a comparator connected for receiving images of the television signal being received by said first signal processing equipment and comparing the received images with data stored in selected storage areas of said second storage device, said comparator being operative for producing a first report when a television image being received by said comparator corresponds to an image for which data is stored in that one of said first storage areas which is associated with the television channel to which said first signal processing equipment is tuned, and for producing a second report when a television image being received by said comparator after production of the first report corresponds to an image for which data is stored in said second storage area, and said comparator being coupled to said control equipment via said data bus for sending the first and second reports to said control equipment; and a third storage device coupled to said analog-to-digital converter for constantly storing at least a part of successive frames of the television signal being received by said first signal processing equipment, said third storage device being operative under control of said control equipment for storing in said second storage area of said second storage device data representing at least a selected part of a television signal frame which precedes in time the first report produced by said comparator;

wherein, said control equipment is operative for suppressing display or recording of the television signal to which said first signal processing equipment is tuned in response to receipt of the first report and for resuming display or recording of the television signal to which said first signal processing equipment is tuned in response to receipt of the second report.

37. Apparatus according to claim 36 further comprising data reduction equipment connected ahead of said third storage device for reducing the quantity of data of the television frames to be written into said third storage device.

38. Apparatus according to claim 37 wherein data-reduced television frames from said data reduction equipment are intermediately stored in said third storage device in order to enable a suitable selection of an initial image which characterizes the undesired video scene, by means of a control transmitter, by display of the intermediately stored television frames by display equipment by operation of data expansion equipment, said frame storage device and a digital-to-analog converter, as well as to enable the selection of the final image, which characterizes the undesired video scene, by said control equipment.

39. Apparatus according to claim 36 further comprising second signal processing equipment and a second analog-to-digital converter operative for enabling display of television images of a second channel for as long as the television signal to which said first signal processing equipment is used contains an undesired video scene.

40. Apparatus according to claim 36 further comprising a control transmitter having a key which is manually operable for performing one of: identification of television images characterizing the beginning of the undesired video scenes; and activation of an operational mode in which the display of undesired video scenes is prevented.

41. Apparatus according to claim 36 further comprising a connecting terminal for connection to a video recording device, by way of which terminal an interval switching pulse is provided to prevent the video recording of a recognized undesired video scene.

* * * * *